(12) United States Patent
Lesage et al.

(10) Patent No.: US 9,475,344 B2
(45) Date of Patent: Oct. 25, 2016

(54) PNEUMATIC ARTICLE WITH GAS TIGHT LAYER INCLUDING A THERMOPLASTIC ELASTOMER

(75) Inventors: Pierre Lesage, Clermont-Ferrand (FR); Emmanuel Custodero, Chamalieres (FR)

(73) Assignees: Michelin Recherche et Technique S.A., Granges-Paccot (CH); COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 748 days.

(21) Appl. No.: 12/601,812

(22) PCT Filed: May 20, 2008

(86) PCT No.: PCT/EP2008/004024
§ 371 (c)(1),
(2), (4) Date: Nov. 24, 2009

(87) PCT Pub. No.: WO2008/145276
PCT Pub. Date: Dec. 4, 2008

(65) Prior Publication Data
US 2010/0175804 A1    Jul. 15, 2010

(30) Foreign Application Priority Data
May 29, 2007   (FR) ...................................... 07 03840

(51) Int. Cl.
*B60C 5/14* (2006.01)
*B60C 1/00* (2006.01)
(Continued)

(52) U.S. Cl.
CPC ......... *B60C 1/0008* (2013.04); *B29D 30/0681* (2013.01); *B60C 5/14* (2013.01);
(Continued)

(58) Field of Classification Search
CPC .................. B60C 1/0008; B60C 5/14; B29D 2030/0682; B29D 30/0681; Y10T 428/1379; Y10T 152/10684; Y10T 152/10693; Y10T 152/10702; Y10T 152/10711
USPC ................................ 152/510, 506, 503, 502
See application file for complete search history.

(56) References Cited

U.S. PATENT DOCUMENTS 5,665,183 A * 9/1997 Kresge et al. ................ 152/204
5,824,170 A   10/1998 Weston et al.
(Continued)

FOREIGN PATENT DOCUMENTS

EP    0 597 362    5/1994
EP    0 722 850    7/1996
(Continued)

OTHER PUBLICATIONS

English Language Machine Translation of JP 2003192867, 2003.*
(Continued)

*Primary Examiner* — Michael H Wilson
*Assistant Examiner* — Philip N Schwartz
(74) *Attorney, Agent, or Firm* — Cozen O'Connor

(57) ABSTRACT

Inflatable article equipped with an elastomer layer impermeable to the inflation gases, said elastomer layer comprising at least, as the predominant elastomer, a thermoplastic stirene/isobutylene/stirene (SIBS) elastomer. Preferably the SIBS elastomer comprises between 5% and 50% by weight of stirene, its number-average molecular weight is between 30 000 and 500 000 g/mol, and its $T_g$ is below −20° C. Preferably the airtight elastomer layer also comprises, as a plasticizing agent, an extender oil for the SIBS elastomer with a content preferably between 5 and 100 phr. The inflatable article is, in particular, an inner tube or a pneumatic tire for a motor vehicle.

11 Claims, 1 Drawing Sheet

(51) Int. Cl.
 B29D 30/06 (2006.01)
 C08L 53/00 (2006.01)
 C08L 53/02 (2006.01)
 C08K 5/01 (2006.01)
(52) U.S. Cl.
 CPC ............... C08L 53/00 (2013.01); C08L 53/02 (2013.01); C08L 53/025 (2013.01); B29D 2030/0682 (2013.01); C08K 5/01 (2013.01); Y10T 428/1379 (2015.01)

(56) References Cited

U.S. PATENT DOCUMENTS

| | | | |
|---|---|---|---|
| 6,329,459 | B1 | 12/2001 | Kang et al. |
| 6,334,919 | B1* | 1/2002 | Takeyama et al. ............ 156/123 |
| 2001/0041762 | A1* | 11/2001 | Ikawa et al. .................. 524/262 |
| 2004/0031550 | A1 | 2/2004 | Kanenari et al. |
| 2005/0137312 | A1* | 6/2005 | DuBois ........................ 524/474 |
| 2005/0197442 | A1* | 9/2005 | Jones et al. .................. 524/474 |
| 2006/0052535 | A1* | 3/2006 | Ajbani et al. ................... 525/88 |
| 2006/0167184 | A1* | 7/2006 | Waddell et al. .............. 525/192 |
| 2006/0254695 | A1* | 11/2006 | Higuchi et al. ............... 156/133 |

FOREIGN PATENT DOCUMENTS

| | | | | |
|---|---|---|---|---|
| EP | 0 814 126 | | 12/1997 | |
| EP | 1 195 402 | | 4/2002 | |
| EP | 1 419 903 | | 5/2004 | |
| EP | 1 544 249 | | 6/2005 | |
| EP | 1 632 335 | | 3/2006 | |
| JP | 63-082802 | | 4/1988 | |
| JP | 06107896 A | * | 4/1994 | ............. C08L 53/00 |
| JP | 06-200098 | | 7/1994 | |
| JP | 10-110086 | | 4/1998 | |
| JP | 10-114850 | | 5/1998 | |
| JP | 2001-279051 | | 10/2001 | |
| JP | 2001279051 A | * | 10/2001 | ............. C08L 53/00 |
| JP | 2002-002213 | | 1/2002 | |
| JP | 2002-161186 | | 6/2002 | |
| JP | 2003192867 A | * | 7/2003 | ............. C08L 53/00 |
| JP | 2005216725 A | * | 8/2005 | ............. H01M 8/04 |
| WO | WO 2004/011551 | | 2/2004 | |
| WO | WO 2006047509 | * | 5/2006 | ............. C08K 11/00 |
| WO | WO 2007/044104 | | 4/2007 | |

OTHER PUBLICATIONS

Mineral Oil Specification sheet, 2002.*
U.S. Environmental Protection Agency Hazard Characterization Document accessed from http://www.epa.gov/chemrtk/hpvis/hazchar/Category_Waxes%20and%20Related%20Materials_September_2011.pdf on Dec. 2, 2013, p. 13.*
Machine translation of JP06-107896 (no date).*
Machine translation of JP2005-216725 (no date).*

* cited by examiner

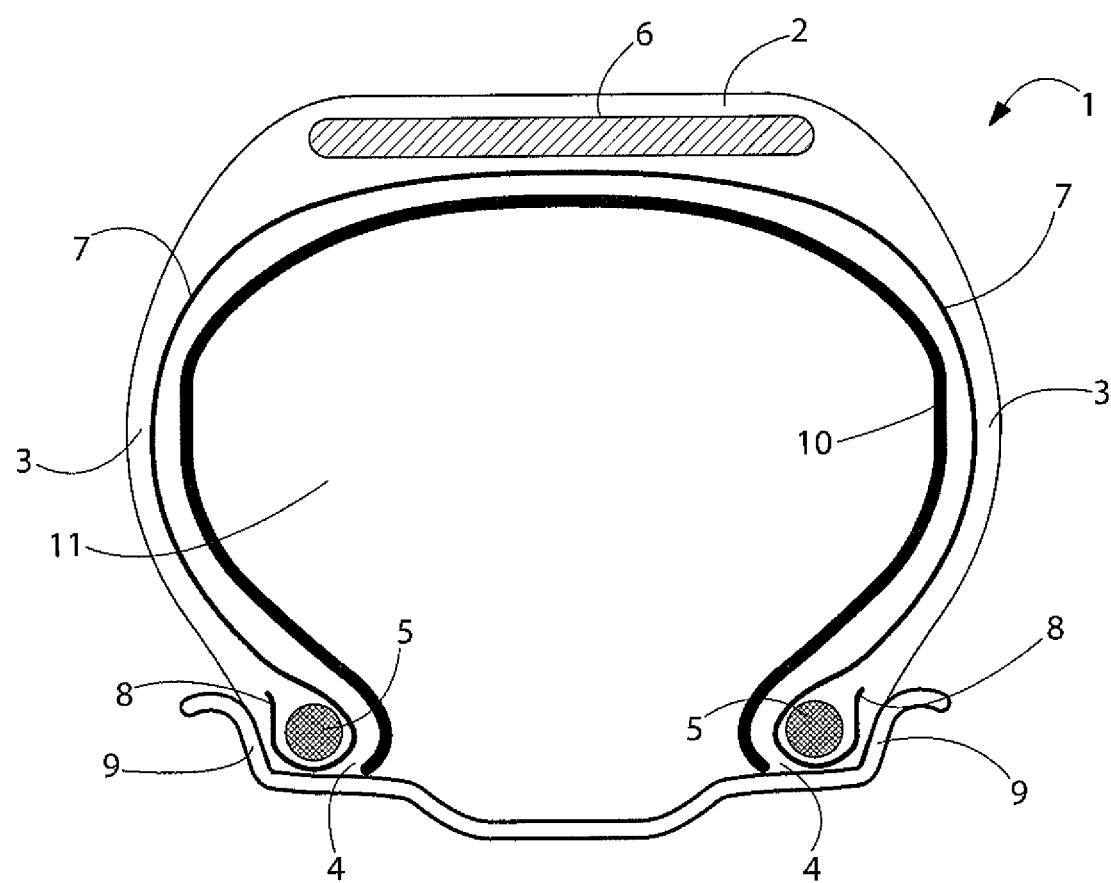

PNEUMATIC ARTICLE WITH GAS TIGHT LAYER INCLUDING A THERMOPLASTIC ELASTOMER

RELATED APPLICATIONS

This is a U.S. national stage under 35 USC §371 of application No. PCT/EP2008/004024, filed on May 20, 2008.

This application claims the priority of French application no. 07/03840 filed May 29, 2007, the entire content of which is hereby incorporated by reference.

FIELD OF THE INVENTION

The present invention relates to "inflatable" articles, that is to say, by definition, to articles that assume their useable shape when they are inflated with air or with an equivalent inflation gas.

It relates more particularly to the gastight layers that ensure the impermeability of these inflatable articles, in particular that of pneumatic tires.

BACKGROUND OF THE INVENTION

In a conventional pneumatic tire of the "tubeless" type (that is to say of the type without an inner tube), the radially internal face comprises an airtight layer (or more generally a layer that is impermeable to any inflation gas) which enables the pneumatic tire to be inflated and kept under pressure. Its airtightness properties enable it to guarantee a relatively low rate of pressure loss, making it possible to keep the tire inflated, in the normal operating state, for a sufficient time, normally several weeks or several months. It also has the role of protecting the carcass reinforcement from the diffusion of air coming from the internal space of the tire.

This role of airtight inner layer or "inner liner" is today fulfilled by compositions based on butyl rubber (isobutylene/isoprene copolymer), long renowned for their excellent airtightness properties.

However, one well-known drawback of compositions based on butyl rubber or elastomer is that they have high hysteresis losses, furthermore over a wide temperature range, which drawback degrades the rolling resistance of pneumatic tires.

Reducing the hysteresis of these airtightness inner layers and therefore, in fine, the fuel consumption of motor vehicles, is a general objective which current technology comes up against.

However, the inventors discovered, during their research, that an elastomer other than butyl makes it possible to obtain airtight inner layers that respond to such an objective, while providing the latter with very good airtightness properties.

Thus, according to a first object, the present invention relates to an inflatable article equipped with an elastomer layer impermeable to inflation gases such as air, said elastomer layer comprising at least, as the predominant elastomer, a thermoplastic stirene/isobutylene/stirene (SIBS) elastomer.

Compared with butyl rubbers, SIBS has also the major advantage, due to its thermoplastic nature, of being able to be worked as is in the molten (liquid) state, and consequently of offering a possibility of simplified processing.

The invention particularly relates to inflatable articles made of rubber such as pneumatic tires, or inner tubes, especially inner tubes for a pneumatic tire.

The invention relates more particularly to the pneumatic tires intended to be fitted on motor vehicles of the passenger type, SUV (Sport Utility Vehicle) type, two-wheeled vehicles (especially motorcycles), aircraft, industrial vehicles chosen from vans, heavy vehicles—that is to say underground trains, buses, road transport vehicles (lorries, towing vehicles, trailers), off-road vehicles, such as agricultural and civil-engineering vehicles—and other transport or handling vehicles.

The invention also relates to a process for sealing an inflatable article with respect to inflation gases, in which a gastight elastomer layer as defined above is incorporated into said inflatable article during its manufacture or is added to said inflatable article after its manufacture.

The invention also relates to the use, in an inflatable article, of an elastomer layer as defined above as a layer impermeable to inflation gases.

BRIEF DESCRIPTION OF THE SINGLE DRAWING

The single figure shows, in radial cross section, a pneumatic tire according to an embodiment of the invention.

I. DETAILED DESCRIPTION OF THE SINGLE DRAWING

In the present description, unless otherwise indicated, all the percentages (%) indicated are % by weight.

Moreover, any range of values denoted by the expression "between a and b" represent the field of values ranging from more than a to less than b (that is to say limits a and b excluded) whereas any range of values denoted by the expression "from a to b" means the field of values ranging from a up to b (that is say including the strict limits a and b).

I-1. Gastight Elastomer Layer

The inflatable article according to the invention has the main feature of being provided with at least one gastight elastomer layer or composition which comprises at least, as the predominant elastomer (by weight), a thermoplastic SIBS elastomer with which, according to one preferred embodiment of the invention, at least one extender oil as plasticizing agent, may be combined.

I-1-A. Thermoplastic Sibs Elastomer

The expression "SIBS elastomer" is understood in the present application to mean, by definition, any stirene/isobutylene/stirene triblock elastomer in which the central polyisobutylene block can be interrupted or not by one or more unsaturated units, in particular one or more diene units such as isoprene units, which are optionally halogenated.

The above SIBS elastomer belongs, in a known manner, to the family of thermoplastic elastomers (TPEs), more precisely thermoplastic stirene (TPS) elastomers.

It is recalled here that TPS elastomers are generally in the form of stirene-based block copolymers. Having a structure intermediate between thermoplastic polymers and elastomers, they are composed of hard polystirene blocks linked by flexible elastomer blocks, for example polybutadiene, polyisoprene, poly(ethylene-butylene) or else polyisobutylene blocks in the case, for example, of SIBS. They are often triblock elastomers with two hard segments linked by a flexible segment. The hard and flexible segments may be in a linear, star or branched configuration. Typically, each of these segments or blocks contains at least more than 5, generally more than 10 base units (for example stirene units and isoprene units for SIBS).

According to one preferred embodiment of the invention, the weight content of stirene in the SIBS elastomer is between 5% and 50%. Below the minimum indicated, the thermoplastic nature of the elastomer runs the risk of being substantially reduced, whereas above the recommended maximum the elasticity of the airtight layer may be adversely affected. For these reasons, the stirene content is more preferably between 10% and 40%, in particular between 15 and 35%.

The term "stirene" should be understood in the present description as meaning any monomer based on unsubstituted or substituted stirene; among the substituted stirenes mention may be made, for example, of methylstirenes (for example, α-methylstirene, β-methylstirene, p-methylstirene, tert-butylstirene), chlorostirenes (for example monochlorostirene, dichlorostirene).

It is preferable for the glass transition temperature ($T_g$, measured according to ASTM D3418) of the SIBS elastomer to be below −20° C., more preferably below −40° C. A $T_g$ value above these minimum temperatures may reduce the performance of the airtight layer when used at a very low temperature; for such a use, the $T_g$ of the SIBS elastomer is more preferably still below −50° C.

The number-average molecular weight (denoted by $M_n$) of the SIBS elastomer is preferably between 30 000 and 500 000 g/mol, more preferably between 40 000 and 400 000 g/mol. Below the minimum values indicated, the cohesion between the SIBS elastomer chains especially due to its optional dilution (in the presence of an extender oil), runs the risk of being adversely affected; moreover, an increase in the usage temperature runs the risk of adversely affecting the mechanical properties, especially the properties at break, consequently leading to reduced "hot" performance. Moreover, too high a molecular weight $M_n$ may be detrimental as regards the flexibility of the gastight layer. Thus, it has been observed that a value lying within a range of 50 000 to 300 000 g/mol was particularly suitable, especially for use of the composition in a pneumatic tire.

The number-average molecular weight ($M_n$) of the SIBS elastomer is determined in a known manner by size exclusion chromatography (SEC). The specimen is first dissolved in tetrahydrofuran with a concentration of about 1 g/l; then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E, and two HT6E) is used. The injected volume of the polymer specimen solution is 100 μl. The detector is a WATERS 2410 differential refractometer and its associated software for handling the chromatographic data is the WATERS MILLENNIUM system. The calculated average molecular weights are relative to a calibration curve obtained with polystirene standards.

The polydispersity index $I_p$ (N.B: $I_p=M_w/M_n$ where $M_w$ is the weight-average molecular weight) of the SIBS elastomer is preferably less than 3, more preferably $I_p$ is less than 2.

The SIBS elastomer may, on its own, constitute the gastight elastomer layer or else be combined, in this elastomer layer, with other components to form an elastomer composition.

If optional other elastomers are used in this composition, the SIBS elastomer constitutes the predominant elastomer by weight; it then preferably represents more than 50%, more preferably more than 70% by weight of all of the elastomers. Such additional elastomers, which are preferably in the minority, could be for example diene elastomers such as natural rubber or a synthetic polyisoprene, a butyl rubber or thermoplastic stirene (TPS) elastomers other than SIBS, within the limit of the compatibility of their microstructures.

As a TPS elastomer other than SIBS that can be used in addition to the SIBS described previously, mention may especially be made of a TPS elastomer chosen from the group consisting of stirene/butadiene/stirene block copolymers, stirene/isoprene/stirene block copolymers, stirene/isoprene/butadiene/stirene block copolymers, stirene/ethylene-butylene/stirene block copolymers, stirene/ethylene-propylene/stirene block copolymers, stirene/ethylene-ethylene-propylene/stirene block copolymers and mixtures of these copolymers. More preferably, said optional additional TPS elastomer is chosen from the group consisting of stirene/ethylene-butylene/stirene block copolymers, stirene/ethylene-propylene/stirene block copolymers and mixtures of these copolymers.

However, according to one preferred embodiment, the SIBS elastomer is the sole elastomer, and the sole thermoplastic elastomer present in the gastight elastomer layer or composition.

The SIBS elastomers may be processed in a conventional manner for TPEs, by extrusion or moulding, for example starting from a raw material available in the form of beads or granules. They are available commercially, sold for example by KANEKA under the name "SIBSTAR" (e.g. "Sibstar 102T", "Sibstar 103T" or "Sibstar 073T").

They have for example been described, and also their synthesis, in patent documents EP 731 112, U.S. Pat. No. 4,946,899 and U.S. Pat. No. 5,260,383. They were firstly developed for biomedical applications then described in various applications specific to TPE elastomers, as varied as medical equipment, motor vehicle parts or parts for electrical goods, sheaths for electrical wires, sealing or elastic parts (see, for example, EP 1 431 343, EP 1 561 783, EP 1 566 405 and WO 20051103146).

However, to the knowledge of the Applicants no prior art document either describes nor suggests their use, as the predominant elastomer, in a gastight elastomer layer of an inflatable article, in particular in a pneumatic tire, where this product has proved, quite unexpectedly, capable of competing with conventional compositions based on butyl rubber.

I-1-B. Extender Oil

The SIBS elastomer described previously is sufficient by itself for the function of impermeability to gases with respect to the inflatable articles in which it is used to be fulfilled.

However, according to one preferred embodiment of the invention, the latter is used in a composition which also comprises, as a plasticizing agent, an extender oil (or plasticizing oil), the role of which is to facilitate the processing, particularly the integration into the inflatable article via a lowering of the modulus and an increase in the tackifying power of the gastight layer, however, at the expense of a certain loss of impermeability.

Any extender oil may be used, preferably one having a weakly polar character, capable of extending or plasticizing elastomers, especially thermoplastic elastomers. At ambient temperature (23° C.), these oils, which are relatively viscous, are liquids (i.e. as a reminder, substances having the capability of eventually taking the form of their container), as opposed especially to resins, particularly to tackifying resins, which are by nature solids.

Preferably, the extender oil is chosen from the group consisting of polyolefin oils (i.e. those resulting from the polymerization of olefins, monoolefins or diolefins), paraffinic oils, naphthenic oils (of low or high viscosity), aromatic oils, mineral oils and mixtures of these oils.

It should be noted that the addition of an extender oil to the SIBS leads to a loss of impermeability of the latter, which varies depending on the type and amount of oil used. Preferably, a polybutene-type oil, in particular a polyisobutylene (PIB) oil, is used, which demonstrated the best compromise of properties compared with the other oils tested, especially compared with a conventional oil of paraffinic type.

Examples of polyisobutylene oils include those sold in particular by Univar under the trade name "Dynapak Poly" (e.g. "Dynapak Poly 190"), by BASF under the trade names "Glissopal" (e.g. "Glissopal 1000") or "Oppanol" (e.g. "Oppanol B12"); paraffinic oils are sold for example by Exxon under the trade name "Telura 618" or by Repsol under the trade name "Extensol 51".

The number-average molecular weight ($M_n$) of the extender oil is preferably between 200 and 25 000 g/mol, more preferably still between 300 and 10 000 g/mol. For excessively low $M_n$ values, there is a risk of the oil migrating to the outside of the composition, whereas excessively high $M_n$ values may result in this composition becoming too stiff. An $M_n$ value between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, the specimen being firstly dissolved in tetrahydrofuran with a concentration of about 1 g/l and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 μl. The detector is a WATERS 2410 differential refractometer and its associated software for handling the chromatograph data is the WATERS MILLENIUM system. The calculated average molecular weights are relative to a calibration curve obtained with polystyrene standards.

A person skilled in the art will know, in the light of the description and the embodiments that follow, how to adjust the quantity of extender oil according to the particular usage conditions of the gastight elastomer layer, in particular of the inflatable article in which it is intended to be used.

It is preferable for the extender oil content to be greater than 5 phr, preferably between 5 and 100 phr (parts by weight per hundred parts of total elastomer, that is to say SIBS plus any other possible elastomer present in the elastomer composition or layer).

Below the indicated minimum, the elastomer composition runs the risk of having too high a rigidity for certain applications, whereas above the recommended maximum there is a risk of the composition having insufficient cohesion and of a loss of impermeability which may be damaging depending on the application in question.

For these reasons, in particular for use of the airtight composition in a pneumatic tire, the extender oil content is preferably greater than 10 phr, especially between 10 and 90 phr, more preferably still is greater than 20 phr, especially between 20 and 80 phr.

I-1-C. Various Additives

The airtight layer or composition described above may furthermore comprise the various additives usually present in the airtight layers known to a person skilled in the art. Mention will be made, for example, of reinforcing fillers such as carbon black or silica, non-reinforcing or inert fillers, colorants that can advantageously be used for colouring the composition, platy fillers that further improve the impermeability (e.g. phyllosilicates such as kaolin, talc, mica, graphite, clays or modified clays ("organoclays"), plasticizers other than the aforementioned extender oils, stabilizers such as antioxidants or antiozonants, UV stabilizers, various processing aids or other stabilizers, or else promoters capable of promoting adhesion to the remainder of the structure of the inflatable article.

Besides the elastomers (SIBS and other possible elastomers) described previously, the gastight composition could also comprise, always in a minority weight fraction relative to the SIBS elastomer, polymers other than elastomers, such as for example thermoplastic polymers compatible with the SIBS elastomer.

The gastight layer or composition described previously is a compound that is solid (at 23° C.) and elastic, which is especially characterized, thanks to its specific formulation, by a very high flexibility and very high deformability.

According to one preferred embodiment of the invention, this gastight layer or composition has a secant extension modulus, at 10% elongation (denoted by M10), which is less than 2 MPa, more preferably less than 1.5 MPa (especially less than 1 MPa). This quantity is measured at first elongation (that is to say without an accommodation cycle) at a temperature of 23° C., with a pull rate of 500 mm/min (ASTM D412 standard), and normalized to the initial cross section of the test specimen.

I-2. Use Of The Airtight Layer In A Pneumatic Tire

The layer or composition based on SIBS described previously can be used as an airtight layer in any type of inflatable article. As examples of such inflatable articles, mention may be made of inflatable boats, balloons or balls used for games or sports.

Said composition is particularly suitable for use as an airtight layer (or a layer that is impermeable to any other inflation gas, for example nitrogen) in an inflatable article, whether a finished or semi-finished product, made of rubber, most particularly in a pneumatic tire for a motor vehicle such as a two-wheeled, passenger or industrial vehicle.

Such an airtight layer is preferably placed on the inner wall of the inflatable article, but it may also be completely integrated into its internal structure.

The thickness of the airtight layer is preferably greater than 0.05 mm, more preferably between 0.1 mm and 10 mm (especially between 0.1 and 1.0 mm).

It will be readily understood that, depending on the specific fields of application and on the dimensions and pressures involved, the method of implementing the invention may vary, the airtight layer then having several preferential thickness ranges.

Thus, for example, in the case of passenger vehicle tires, it may have a thickness of at least 0.4 mm, preferably between 0.8 and 2 mm. According to another example, in the case of heavy or agricultural vehicle tires, the preferred thickness may be between 1 and 3 mm. According to another example, in the case of pneumatic tires for vehicles in the civil engineering field or for aircraft, the preferred thickness may be between 2 and 10 mm.

Compared with a usual airtight layer based on butyl rubber, the airtight composition described above has the advantage of exhibiting a much lower hysteresis, and therefore of offering the pneumatic tires a reduced rolling resistance, as is demonstrated in the following exemplary embodiments.

II. EXEMPLARY EMBODIMENTS OF THE INVENTION

The gastight elastomer layer described previously can advantageously be used in the pneumatic tires of all types of vehicles, in particular passenger vehicles or industrial vehicles such as heavy vehicles.

As an example, the single appended FIGURE shows very schematically (not drawn to scale), a radial cross section of a pneumatic tire according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotation axis of the pneumatic tire, which is located at mid-distance of the two beads 4 and passes through the middle of the crown reinforcement 6).

The inner wall of the pneumatic tire 1 comprises an airtight layer 10, for example having a thickness equal to around 0.9 mm, on the side of the internal cavity 11 of the pneumatic tire 1.

This inner layer (or "inner liner") covers the entire inner wall of the pneumatic tire, extending from one sidewall to the other, at least as far as the rim flange when the pneumatic tire is in the fitted position. It defines the radially internal face of said pneumatic tire intended to protect the carcass reinforcement from the diffusion of air coming from the internal space 11 of the pneumatic tire. It enables the pneumatic tire to be inflated and kept under pressure. Its airtightness properties ought to enable it to guarantee a relatively low rate of pressure loss, and to make it possible to keep the pneumatic tire inflated, in the normal operating state, for a sufficient time, normally several weeks or several months.

Unlike a conventional pneumatic tire that uses a composition based on butyl rubber, the pneumatic tire according to the invention uses, in this example, as the airtight layer 10, an SIBS elastomer ("Sibstar 102T" with a stirene content of around 15%, a $T_g$ of around −65° C. and an $M_n$ of around 90 000 g/mol) extended with approximately 55 phr of a PIB oil ("Dynapak Poly 190"—$M_n$ of around 1000 g/mol).

The pneumatic tire provided with its airtight layer (10) as described above may be produced before or after vulcanization (or curing).

In the first case (i.e., before vulcanization of the pneumatic tire), the airtight layer is simply applied in a conventional manner at the desired place, so as to form the layer 10. The vulcanization is then carried out conventionally. The SIBS elastomers are well able to withstand the stresses associated with the vulcanization step.

One advantageous manufacturing variant, for a person skilled in the art of pneumatic tires, would consist for example during a first step, in laying down the airtight layer directly onto a building drum, in the form of a skim with a suitable thickness, before this is covered with the rest of the structure of the pneumatic tire, according to manufacturing techniques well known to a person skilled in the art.

In the second case (i.e. after curing of the pneumatic tire), the airtight layer is applied to the inside of the pneumatic tire cured by any appropriate means, for example by bonding, by spraying or else by extrusion and blow moulding a film of suitable thickness.

In the following examples, the airtightness properties were first analysed on test specimens of compositions based on butyl rubber on the one hand and on SIBS ("Sibstar 102T") on the other hand (with and without extender oil, as regards the SIBS elastomer).

For this analysis, a rigid-wall permeameter was used, placed in an oven (temperature of 60° C. in the present case), equipped with a pressure sensor (calibrated in the range of 0 to 6 bar) and connected to a tube equipped with an inflation valve. The permeameter may receive standard test specimens in disc form (for example having a diameter of 65 mm in the present case) and with a uniform thickness which may range up to 3 mm (0.5 mm in the present case). The pressure sensor is connected to a National Instruments data acquisition card (0-10 V analogue four-channel acquisition) which is connected to a computer that carries out a continuous acquisition with a frequency of 0.5 Hz (1 point every two seconds). The permeability coefficient (K) is measured from the linear regression line (average over 1000 points) giving the slope α of the pressure loss through the test specimen tested as a function of the time, after a stabilization of the system, that is to say after obtaining a steady state during which the pressure decreases linearly as a function of the time.

Firstly, the SIBS used alone, that is to say without extender oil or other additive, turned out to have, at equal thickness a very low permeability coefficient, equal to that of the usual composition based on butyl rubber. Its modulus M10 is itself nearly 40% less than that of the control composition (1.4 MPa compared to 2.3 MPa).

This already constitutes a remarkable result for such a material.

As already indicated, if a certain loss of impermeability is accepted in compensation, the addition of an extender oil to the SIBS elastomer advantageously makes it possible to facilitate the integration of the elastomer composition into the inflatable article, via a reduction of the modulus and an increase in the tackifying power of the latter.

Thus, by using for example 45 and 65 phr of extender oil, it was observed that the permeability coefficient was increased (and therefore the impermeability reduced) by more than a factor of two (2.2 and 3.4 times, respectively) in the presence of a conventional oil such as paraffinic oil, whereas this coefficient was only increased by a factor substantially lower than two (1.5 and 1.6 times, respectively) in the presence of the PIB oil ("Dynapak Poly 190"), a factor finally that is not very detrimental for use in a pneumatic tire.

It is for this reason that the combination of SIBS and PIB oil has proved to offer the best compromise of properties. For this composition based on SIBS and PIB, it was furthermore observed that the modulus M10 was further decreased, reduced to a value of less than 1 MPa.

Following the above laboratory tests, pneumatic tires according to the invention, of the passenger vehicle type (dimension 195/65 R15) were manufactured, their inner wall was covered with an airtight layer (10) having a thickness of 0.9 mm (on a building drum, before manufacture of the rest of the tire), and then the tires were vulcanized. Said airtight layer (10) was formed from SIBS extended with 55 phr of PIB oil, as described above.

These pneumatic tires according to the invention were compared with control tires (Michelin "Energy 3" brand) comprising a conventional airtight layer, of the same thickness, based on butyl rubber. The rolling resistance of the pneumatic tires was measured on a flywheel, according to the ISO 8767 (1992) method.

It was observed that the pneumatic tires of the invention had a rolling resistance that was reduced very significantly, and unexpectedly for a person skilled in the art, by almost 4% relative to the control pneumatic tires.

In conclusion, the invention offers the designers of pneumatic tires the opportunity of reducing the hysteresis of the inner sealing layers very substantially, and therefore of reducing the fuel consumption of motor vehicles fitted with such tires.

SIBS also has the major advantage, due to its thermoplastic nature, of being able to be worked in the molten (liquid) state and therefore of offering a possibility of improved processing of these airtightness inner layers compared to usual butyl rubber compositions.

The invention claimed is:

1. An inflatable article equipped with an elastomer layer impermeable to inflation gases, wherein said elastomer layer comprises at least, as the predominant elastomer, a thermoplastic styrene/isobutylene/styrene (SIBS) elastomer, and between 20 and 80 phr (parts by weight per hundred parts of total elastomer in the elastomer layer) of a polybutene-type oil, said SIBS elastomer comprises between 5 and 50% by weight of styrene.

2. The inflatable article according to claim 1, wherein the glass transition temperature ($T_g$) of the SIBS elastomer is less than −20° C.

3. The inflatable article according to claim 1, wherein the number-average molecular weight ($M_n$) of the SIBS elastomer is between 30 000 and 500 000 g/mol.

4. The inflatable article according to claim 1, wherein the polybutene-type oil is a polyisobutylene oil.

5. The inflatable article according 1, wherein the number-average molecular weight ($M_n$) of the polybutene-type oil is between 200 and 25 000 g/mol.

6. The inflatable article according to claim 1, wherein the airtight layer has a thickness greater than 0.05 mm.

7. The inflatable article according to claim 1, wherein the airtight layer has a thickness between 0.1 mm and 10 mm.

8. The inflatable article according to claim 1, wherein the airtight layer is placed on the inner wall of the inflatable article.

9. The inflatable article according to claim 1, wherein said article is made of rubber.

10. The inflatable article according to claim 1, wherein said inflatable article is a pneumatic tire.

11. The inflatable article according to claim 1, wherein said inflatable article is an inner tube.

* * * * *

UNITED STATES PATENT AND TRADEMARK OFFICE
CERTIFICATE OF CORRECTION

PATENT NO. : 9,475,344 B2  
APPLICATION NO. : 12/601812  
DATED : October 25, 2016  
INVENTOR(S) : Lesage et al.

It is certified that error appears in the above-identified patent and that said Letters Patent is hereby corrected as shown below:

On the Title Page

(73) Assignees should read: Michelin Recherche et Technique S.A., Granges-Paccot (CH); COMPAGNIE GENERALE DES ETABLISSEMENTS MICHELIN, Clermont-Ferrand (FR)

Signed and Sealed this  
Thirty-first Day of January, 2017

Michelle K. Lee  
*Director of the United States Patent and Trademark Office*